US007204163B2

(12) United States Patent
Uldry et al.

(10) Patent No.: US 7,204,163 B2
(45) Date of Patent: Apr. 17, 2007

(54) MECHANICAL PISTON PIPETTE

(75) Inventors: Jean-Pierre Uldry, La Conversion (CH); Sylvain Christen, Denges (CH)

(73) Assignee: Socorex Isba S.A., Ecublens (CH)

( * ) Notice: Subject to any disclaimer, the term of this patent is extended or adjusted under 35 U.S.C. 154(b) by 233 days.

(21) Appl. No.: 10/916,359

(22) Filed: Aug. 11, 2004

(65) Prior Publication Data

US 2005/0039550 A1 Feb. 24, 2005

(30) Foreign Application Priority Data

Aug. 19, 2003 (EP) .................................. 03405604

(51) Int. Cl.
*G01N 1/00* (2006.01)

(52) U.S. Cl. ................................................... 73/864.18

(58) Field of Classification Search ................. 73/1.36, 73/864.18

See application file for complete search history.

(56) References Cited

U.S. PATENT DOCUMENTS 5,413,006 A 5/1995 D Autry
5,531,131 A 7/1996 Sabloewski
5,650,124 A 7/1997 Gilson
5,792,424 A 8/1998 Homberg
5,998,218 A * 12/1999 Conley et al. .............. 436/180
6,295,880 B1 10/2001 Gilson

FOREIGN PATENT DOCUMENTS

| | | |
|---|---|---|
| EP | 0153058 A | 8/1985 |
| EP | 1197264 A | 4/2002 |
| FR | 2807343 A | 10/2001 |

* cited by examiner

*Primary Examiner*—Robert Raevis
(74) *Attorney, Agent, or Firm*—Clifford W. Browning; Krieg DeVault LLP

(57) ABSTRACT

The mechanical piston pipette comprises a pipette body, a piston/cylinder assembly, the cylinder being arranged so as to be able to be equipped with a replaceable tip, and a tip ejector device, movable along the cylinder in order to eject a tip from the end of the cylinder. The pipette body accommodates an ejection actuation device and a piston actuation device (3, 4, 7) effecting given longitudinal translational travel between a low limit stop position and a high limit stop position in order to perform the aspiration of an adjustable volume of liquid, with means of modifying said travel, means (4) of adjusting the pipetted volume, means (8*e*, 8*f*, 8*g*) of displaying the pipetted volume and calibration means. Said adjustment means, said display means and said calibration means cooperate as an adjustment and calibration device (8) in which, during a calibration operation, said display means are regulated so as to make the displayed volume equate with the pipetted real volume and said adjustment and calibration device (8) is housed inside the pipette body.

20 Claims, 2 Drawing Sheets

MECHANICAL PISTON PIPETTE

Figure 1:
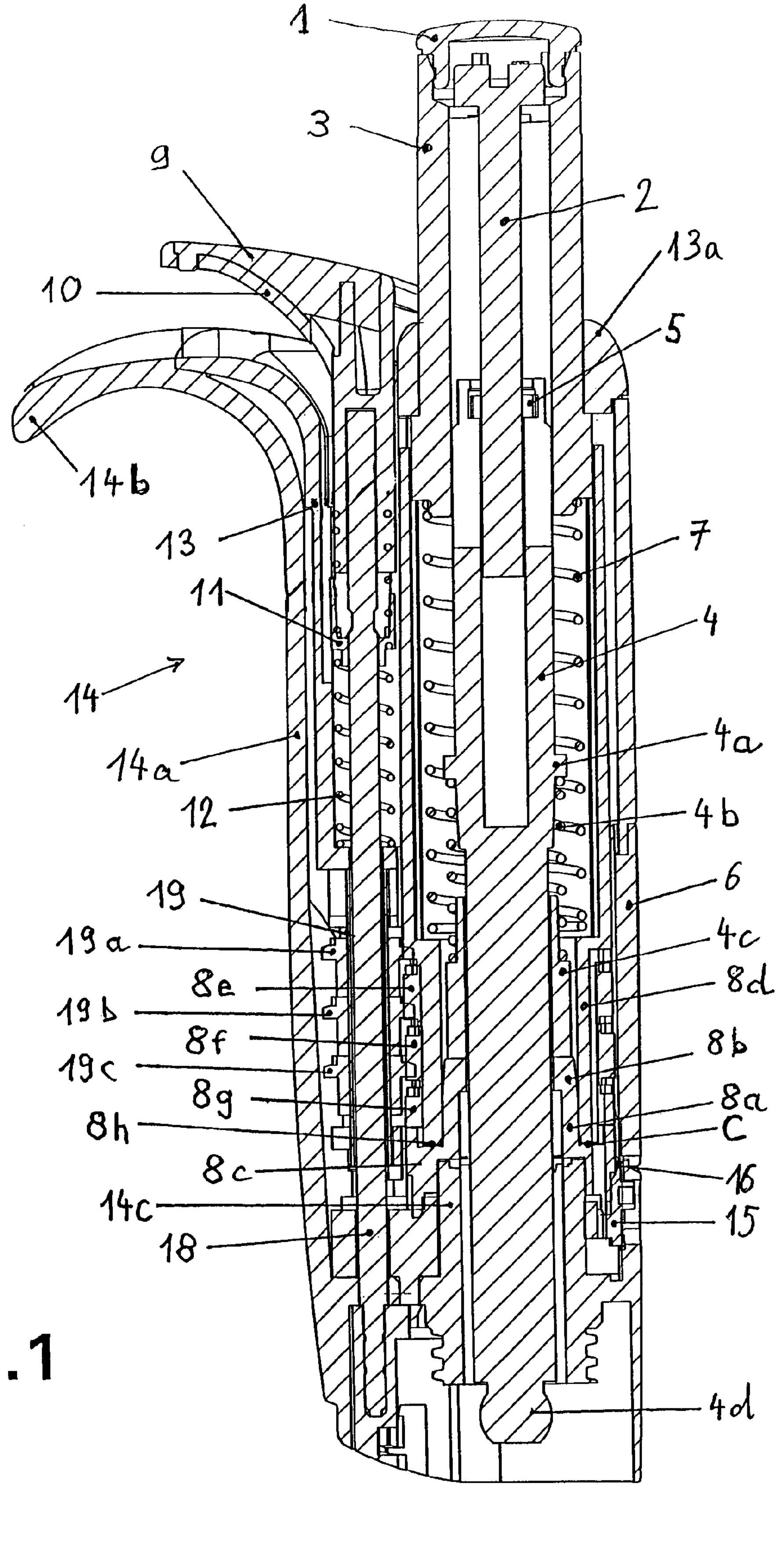

The present invention concerns a mechanical piston pipette comprising a pipette body, a piston/cylinder assembly, the cylinder being arranged so as to be able to be equipped with a replaceable tip, and a tip ejector device, movable along the cylinder in order to eject a tip from the end of the cylinder, said pipette body accommodating an ejection actuation device and a piston actuation device effecting given longitudinal translational travel between a low limit stop position and a high limit stop position in order to perform the aspiration and dosing of liquids, with means of modifying said travel.

Very many types of piston pipette are known in the prior art. Mechanical pipettes whose mechanism is entirely actuated by the hand of the user are distinguished. When these pipettes possess a means of displaying the volume, this can be analogue, digital and mechanical, or else electronic. There are also many types of piston pipette actuated by an electric motor and whose display devices or adjustment or calibration devices are also implemented by electromechanical or electronic means. The present invention concerns solely fixed—or adjustable—volume mechanical piston pipettes. When the volume is adjustable, the invention concerns solely pipettes whose volume display is itself mechanical.

For highly repetitive analysis laboratory operations, for example in analysis kits, the use of fixed-volume pipettes is preferred. For operations which are not very repetitive or else in research laboratories, use of adjustable-volume pipettes is generally preferred, allowing a much greater range of use. Even if consideration is taken of only the range of volumes from 1 μl to 1000 μl, which concerns the pipettes commonly referred to as micro-pipettes, whereas the so-called "macro-pipettes" cover the higher volume ranges, a complete range of micro-pipettes in general represents more than 20 different objects present in the catalogue of a manufacturer. A very great concern of manufacturers is therefore reduction of the total number of different components making up the composition of the different micro-pipettes of the same series. It is in particular desirable to be able to use the greatest possible number of common components for producing fixed-volume and variable-volume micro-pipettes, in the comparable volume ranges.

In certain piston pipettes of the prior art, it is necessary to remove several components of the body or of the display device in order to carry out an adjustment or a calibration, with the risks of mislaying these components which result therefrom.

Another concern of manufacturers is to produce ergonomic piston pipettes, allowing many repetitive manipulations without excessive fatigue of the hand, in particular of the thumb of the user, and in particular variable-volume pipettes, whose body is sufficiently compact to be accommodated comfortably in the hollow of the hand of the user, even if the latter has a small-sized hand.

With a concern for ergonomics, it is also desirable to limit the pipette body to the substantially cylindrical part held in the palm of the hand and to eliminate as far as possible the bulky prominent upper parts forming an "L"-shaped grip or a head which, in the pipettes of the prior art, are often used to house the display devices and which shift the centre of gravity of the object upwards.

Finally, it is desirable to have a visual check of the display and calibration device during pipetting, that is to say during a work phase where, in general, the palm of the hand is oriented approximately in the direction of the face of the user, and to arrange this device accordingly.

These aims are achieved in an adjustable-volume pipette, comprising a pipette body, a piston/cylinder assembly, the cylinder being arranged so as to be able to be equipped with a replaceable tip, and a tip ejector device, movable along the cylinder in order to eject a tip from the end of the cylinder, said pipette body accommodating an ejection actuation device and a piston actuation device effecting given longitudinal translational travel between a low limit stop position and a high limit stop position in order to perform the aspiration of liquids, with means of modifying said travel, means of adjusting the pipetted volume, means of displaying the pipetted volume and calibration means, by the fact that said adjustment means, said display means and said calibration means cooperate as an adjustment and calibration device in which, during a calibration operation, said display means are regulated so as to make the displayed volume equate with the pipetted real volume and that said adjustment and calibration device is housed inside the pipette body.

These aims are in particular achieved in such an adjustable-volume pipette or in a fixed-volume pipette of the type defined at the beginning, by the fact that a component defining the low limit stop of said travel changes from a totally locked position to a position in which it can perform transverse motion, that, in the locked position, it prevents the longitudinal movement of a component defining the top-of-travel limit stop and that, in unlocked position, it allows the action of calibration means moving the longitudinal position of said top-of-travel limit stop.

In one embodiment, said component defining the low limit stop position is a calibration disc whose longitudinal position is determined by fixed elements of the pipette body and which can be locked rotation-wise or unlocked rotation-wise by locking means accessible from the outside without dismantling other elements of the pipette.

In one embodiment, said calibration disc is coaxial with an adjustment screw to which it is fixed rotation-wise, said adjustment screw is free to slide longitudinally with respect to said calibration disc, the lower end of said adjustment screw actuating the piston of the pipette, said adjustment screw carries an over-travel limit stop fixed to said adjustment screw, the distance between said over-travel limit stop and said calibration disc, the pipette being at rest, defining said travel, and the adjustment screw is arranged in such a way in the pipette body that a rotation of said adjustment screw is necessarily accompanied by a helicoidal motion.

In one embodiment, said helicoidal movement is obtained by means of longitudinal threads connecting said adjustment screw to a dosing button, and said dosing button also constitutes the member making it possible to actuate the adjustment screw in order to perform the pipetting operations.

In one embodiment, said dosing button accommodates a calibration key fixed rotation-wise to said adjustment screw and free to slide longitudinally.

In one embodiment, during the pipetting operations, the dosing button slides longitudinally in a tube to which it is fixed rotation-wise.

In one embodiment, the lower end of said tube rests on said calibration tube.

In one embodiment, said tube is locked rotation-wise with respect to the body of the pipette.

In one embodiment, said tube interacts with said calibration disc by means of a claw device capable of rotationally driving said tube.

In one embodiment, a device for mechanical display of the volume slaved to the rotation of said tube is provided.

In one embodiment, the device for displaying the volume comprises metering collars coaxial with said tube and drive pinions housed with the ejection device.

In one embodiment, said display device is housed in the lower half of the pipette body.

Figure 2:
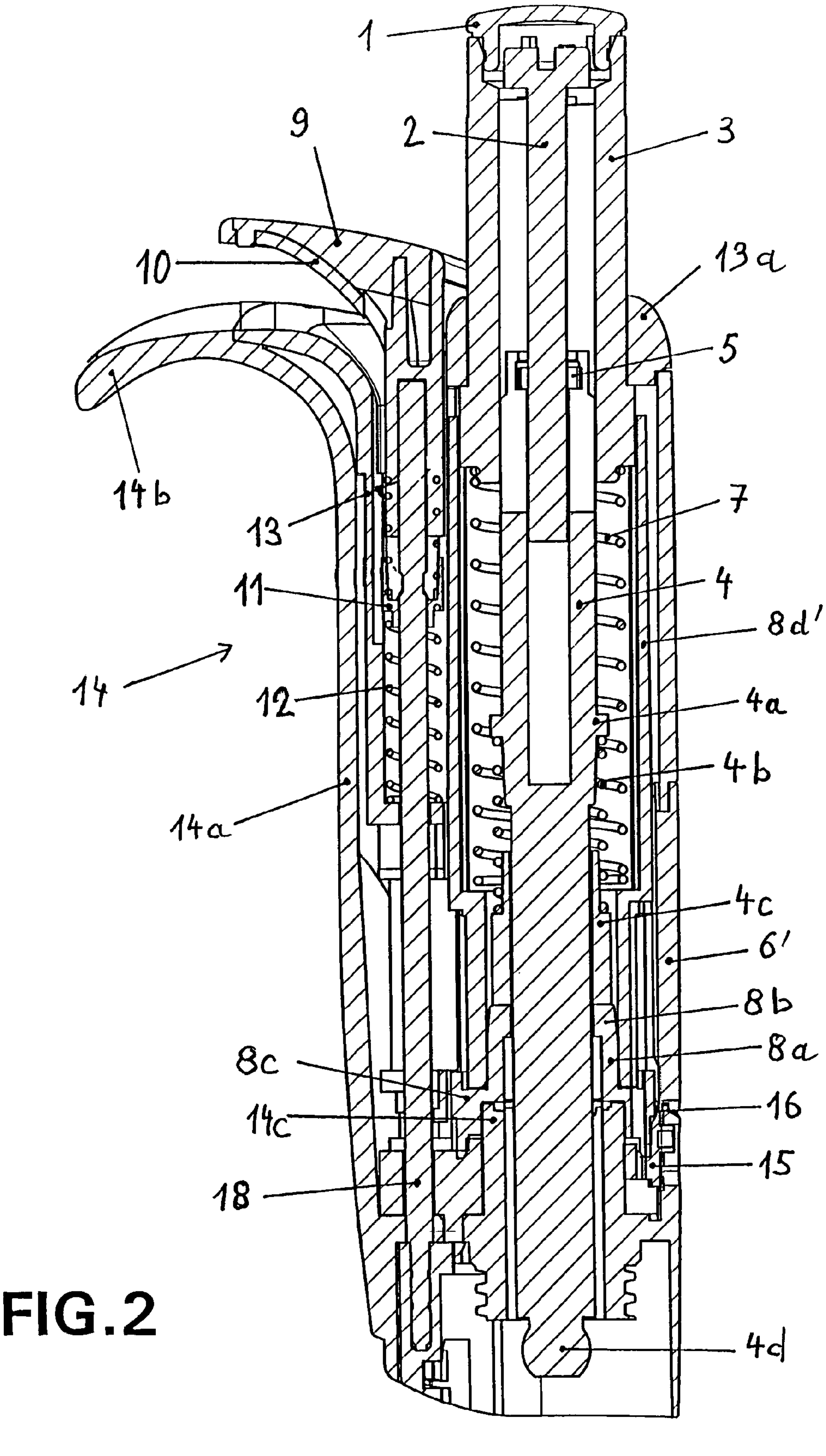

Other particular features and advantages of the invention will become apparent to persons skilled in the art from the following description of two pipette body embodiments, with reference to the drawing, in which FIG. 1 shows a section along the longitudinal axis of an adjustable-volume pipette body;

FIG. 2 shows a section along the longitudinal axis of a fixed-volume pipette body.

The components common to the pipette bodies of FIGS. 1 and 2 are designated by the same reference numbers.

The adjustable-volume pipette body shown by FIG. 1 comprises an external sleeve 14 itself consisting of a longitudinal part 14*a*, substantially cylindrical but with a slight ergonomic bulge in order to fit the palm of the hand, with a substantially elliptic cross-section, the upper part of which is continued laterally by a grip 14*b* in the shape of a comma intended to rest on the side of the index finger of the hand of the user. The external sleeve 14 accommodates an internal sleeve 13 which is housed in the external sleeve 14 on the same side as the grip 14*b*. The internal sleeve 13 has a cylindrical internal wall portion with a section in an arc of a circle, which, with the internal surface of the opposite area of the external sleeve 14, forms a cylindrical housing with a circular section. The internal sleeve 13 is sufficiently thick to accommodate the tip ejection device, which comprises an ejector button 10 surmounted by a protective cap 9. The ejector button is continued by an ejection pin 18 on which there are threaded an ejection spring 12 and a bush 11. The internal sleeve 13 also houses a pinion tube 19 comprising a plurality of rotary pinions, for example three pinions 19*a*, 19*b*, 19*c*, turning about an axis parallel to the longitudinal axis of the pipette and cooperating with the adjustment and calibration device as will be described later. The top of the sleeve 13 is continued laterally by a collar 13*a*, coaxial with the cylindrical housing, which covers the upper opening of the sleeve 14.

A dosing button 3 stands higher than the top of the collar 13*a*. The dosing button 3 is intended to be pushed into the pipette body with the thumb of the user during the pipetting operations, namely aspiration of liquid into the disposable tip and ejection of this liquid. The dosing button 3 is pushed back towards the top by the pipetting spring 7, so as to perform alternating translational movements along the longitudinal axis of the pipette body. The top of the dosing button 3 is closed off by a cap 1. The cap 1 is easily lifted off by the user by means of a fingernail. It can be produced in different colours in order to facilitate visual identification of the pipette.

The dosing button 3 is threaded internally. It receives an externally threaded adjustment screw 4, so that rotation of the dosing button 3 drives the adjustment screw 4 in longitudinal translational motion, when said screw is itself immobilised rotation-wise as described later. In FIG. 1, the adjustment screw 4 is depicted in its lower extreme position. The upper part of the adjustment screw 4 is hollowed out and receives a calibration key 2 which can slide with longitudinal translational motion in the hollow of the adjustment screw 4, but which is immobilised rotation-wise therein. To do this, the hollow of the adjustment screw 4 and the calibration key can both have a square section. The calibration key is threaded into a ring 5.

The middle part of the adjustment screw 4 carries a bulge 4*a*, made in one piece with the body of the screw 4, on which an over-travel spring 4*b* rests. The other end of the over-travel spring 4*b* rests on an over-travel limit stop 4*c* fitted on and fixed to the body of the adjustment screw 4.

The adjustment and calibration device is designated in its entirety by 8. It comprises a calibration disc 8*a*. The calibration disc 8*a* comprises an upper barrel 8*b* surrounding the body of the adjustment screw 4, which slides longitudinally therein, and a lower flange 8*c* with a diameter greater than that of the barrel 8*b*. The calibration disc 8*a* rests on the bottom 14*c* of the external sleeve 14 and thus limits the travel of the screw 4, when the lower face of the limit stop 4*c* comes into contact therewith. An adjustment tube 8*d* rests on the circular horizontal shoulder 8*h* formed between the flange 8*c* and the barrel 8*b*. The adjustment tube 8*d* and the calibration disc 8*a* are coupled together by a claw coupling system C, consisting of two toothed rings facing each other, formed respectively on the shoulder 8*h* of the calibration disc and on the lower front face of the adjustment tube 8*d*. The teeth are small in height and disengage easily. The external sleeve 14 houses, at the level of the calibration disc 8*a*, a locking device consisting of a pad 15 equipped with an elastic catch 16. In the locked position, this pad 15 prevents the rotation of the calibration disc 8*a*. The pad can be operated from the outside, through a hole in the sleeve 14, by any object whatsoever having a fine point.

The calibration disc 8*a* is made fixed rotation-wise to the body of the adjustment screw 4 by means of paired longitudinal ribs/grooves. The top of the adjustment tube 8*d* surrounds the bottom of the dosing button 3. The adjustment tube 8*d* and the dosing button 3 are also fixed rotation-wise by paired ribs/grooves.

The adjustment tube has a lower part with a slightly reduced external diameter, forming a horizontal circular shelf. The adjustment tube 8*d* moreover carries on this lower part a plurality of metering collars, for example three collars 8*e*, 8*f*, 8*g*, carrying on their periphery figures from 0 to 9, providing a digital indication of the volume of liquid pipetted.

The external sleeve 14 comprises, on its side opposite to the grip 14*b* and at the height of the metering collars, a transparent window 6 making it possible to read the volume indication.

The shelf of the adjustment tube 8*d* facing the metering collars comprises several sets of teeth driving the pinion 19*a*. The metering collars comprise a continuous set of teeth on the upper front face but a single indentation on the opposite front face, so that the rotation of the adjustment disc 8*d* drives the first pinion, which in its turn drives the first disc 8*e* which, for example at the end of one complete revolution, drives the second pinion 19*b* making the second metering collar turn by one digit, and so on. This mechanism is known per se.

The adjustment of the volume of liquid aspirated/dispensed by the pipette in normal working mode works as follows:

The locking pad 15 is in the locked position, preventing the rotation of the calibration disc 8*a*. The calibration disc immobilises the rotation of the adjustment screw 4, which is itself fixed rotation-wise to the calibration key 2. The user turns the dosing button 3, which, by means of its internal thread, translationally drives the adjustment screw 4. This longitudinal translational movement carries out the adjustment of the travel extending between the bottom of the travel limit stop 4*c* and the top of the calibration disc 8*a*. This travel itself determines the volume of liquid, since the adjustment screw 4 is connected to the piston of the pipette by its lower end 4*d* in the form of a spherical head constituting a detachable connection.

Simultaneously, the rotation of the dosing button 3 rotationally drives the adjustment tube 8*d* and, via the pinion tube 19, the metering discs 8*e*, 8*f*, 8*g*, as described above. It should be noted that the claw system C is uncoupled, and the tube 8*d* turns on the calibration disc 8*a*, with the teeth of the toothed segments slipping over one another.

After assembly of a pipette, the travel, defined by the distance between the over-travel limit stop 4*c* and the calibration disc 8*a*, does not in the majority of cases match the volume displayed. Calibration is necessary in the factory. The subsequent user may also wish periodically, for example for specific liquids or else after dismantling, cleaning and sterilisation operations, to carry out a recalibration. A calibration operation is performed as follows:

The volume dispensed by the pipette is measured, for example by weighing it. By way of example, the volume measured may be 545 μl whereas the meter displays 210 μl. The calibration operation consists of bringing the value of the display to 545 μl matching the actual volume, without modifying the travel.

To do this, the locking pad 15 is unlocked, thus freeing the rotation of the calibration disc 8*a*. The cap 1 is lifted off in order to access the calibration screw 2. The latter can be actuated either with a coin or a screwdriver, or, after having partially slid towards the outside, can be actuated by hand. Rotation of the calibration key rotationally drives the adjustment screw 4, which itself rotationally drives the calibration disc. While turning the calibration key, the user should be careful to not touch the dosing button 3 in order to not modify the relative position of button 3 and screw 4. The calibration disc rotationally drives the adjustment tube 8*d*, by means of the claw system C. Rotation of the adjustment tube leads to rotation of the pinions of the pinion tube 19 and consequently rotation of the metering collars. The key is turned until the value measured, in this example 545 μl, is displayed. Next, the pad 15 is pushed back into the locking position in order to immobilise, in terms of angular position, the calibration disc 8*a* and the adjustment screw 4. The calibration key 2 is pushed back into its housing and the cap is replaced. As the value of the metering device is copied from the travel, subsequent volume adjustments of the pipette are performed simply by rotation of the dosing button 3, which this time modifies the travel by translational movement of the adjustment screw 4 without rotational movement thereof.

The fixed-volume pipette body shown by FIG. 2 comprises an external sleeve 14 itself consisting of a longitudinal part 14*a*, substantially cylindrical but with a slight ergonomic bulge in order to fit the palm of the hand, with a substantially elliptic cross-section, the upper part of which is continued laterally by a grip 14*b* in the shape of a comma intended to rest on the side of the index finger of the hand of the user. The external sleeve 14 accommodates an internal sleeve 13 which is housed in the external sleeve 14 on the same side as the grip 14*b*. The internal sleeve 13 has a cylindrical internal wall portion with a section in an arc of a circle, which, with the internal surface of the opposite area of the external sleeve 14, forms a cylindrical housing with a circular section. The internal sleeve 13 is sufficiently thick to accommodate the tip ejection device, which comprises an ejector button 10 surmounted by a protective cap 9. The ejector button is continued by an ejection pin 18 on which there are threaded an ejection spring 12 and a bush 11. The site of the pinion tube 19 described above remains empty. The top of the sleeve 13 is continued laterally by a collar 13*a*, coaxial with the cylindrical housing, which covers the upper opening of the sleeve 14.

A dosing button 3 stands higher than the top of the collar 13*a*. The dosing button 3 is intended to be pushed into the pipette body with the thumb of the user during the pipetting operations, namely aspiration of liquid into the disposable tip and ejection of this liquid. The dosing button 3 is pushed back towards the top by the pipetting spring 7, so as to perform alternating translational movements along the longitudinal axis of the pipette body. The top of the dosing button 3 is closed off by a cap 1. The cap 1 is easily lifted off by the user by means of a fingernail. It can be produced in different colours in order to facilitate visual identification of the pipette.

The dosing button 3 is threaded internally. It receives an externally threaded adjustment screw 4. In FIG. 2, the adjustment screw 4 is depicted in its lower extreme position. The upper part of the adjustment screw 4 is hollowed out and receives a calibration key 2 which can slide with longitudinal translational motion in the hollow of the adjustment screw 4, but which is immobilised rotation-wise therein. To do this, the hollow of the adjustment screw 4 and the calibration key can both have a square section. The calibration key is threaded into a ring 5.

The middle part of the adjustment screw 4 carries a bulge 4*a*, made in one piece with the body of the screw 4, on which an over-travel spring 4*b* rests. The other end of the over-travel spring 4*b* rests on an over-travel limit stop 4*c* fitted on and fixed to the body of the adjustment screw 4.

The calibration device is designated in its entirety by 8'. It comprises a calibration disc 8*a*. The calibration disc 8*a* comprises an upper barrel 8*b* surrounding the body of the adjustment screw 4, which slides longitudinally therein, and a lower flange 8*c* with a diameter greater than that of the barrel 8*b*. The calibration disc 8*a* rests on the bottom 14*c* of the external sleeve 14 and thus limits the travel of the screw 4, when the lower face of the limit stop 4*c* comes into contact therewith. The calibration disc 8*a* can be identical to the one shown in FIG. 2, and carry a circular toothed ring, formed on the shoulder 8*h* of the calibration disc; but, in the case of a fixed-volume pipette, this ring has no function. The external sleeve 14 houses, at the level of the calibration disc 8*a*, a locking device consisting of a pad 15 equipped with an elastic catch 16. In the locked position, this pad 15 prevents the rotation of the calibration disc 8*a*. The pad can be operated from the outside, through a hole in the sleeve 14, by any object whatsoever having a fine point. The calibration disc 8*a* is made fixed rotation-wise to the body of the adjustment screw 4 by means of paired longitudinal ribs/grooves.

A tube 8*d'* rests on the circular horizontal shoulder formed between the flange 8*c* and the barrel 8*b*. But the lower front face of the adjustment tube 8*d'* is preferably smooth. The top of the tube 8*d'* surrounds the bottom of the dosing button 3. The tube 8*d'* and the dosing button 3 are also fixed rotation-wise by paired ribs/grooves. Furthermore, the tube 8*d'* carries two longitudinal external ribs which go into longitudinal grooves in the internal sleeve 13. The tube 8*d'* and the dosing button 3 are therefore both immobilised rotation-wise.

The tube 8*d'*, like the tube 8*d* described above, has a lower part with a slightly reduced external diameter, forming a horizontal circular shelf. But the tube 8*d'* does not carry any metering collars.

The external sleeve 14 comprises, on its side opposite to the grip 14*b* and at the height of the lower part of the tube 8*d*, an opaque plate 6' replacing the window 6.

After assembly of a pipette, the travel, defined by the distance between the over-travel limit stop 4*c* and the calibration disc 8*a*, does not in the majority of cases match the nominal volume. Calibration is necessary in the factory. The subsequent user may also wish periodically, for example after dismantling, cleaning and sterilisation operations, to carry out a recalibration. A calibration operation is performed as follows:

The volume dispensed by the pipette is measured, for example by weighing it. By way of example, the volume measured may be 545 μl whereas the nominal value is 500 μl. The calibration operation consists of bringing the value of the actual volume to the nominal value.

To do this, the locking pad 15 is unlocked, thus freeing the rotation of the calibration disc 8*a*. The cap 1 is lifted off in order to access the calibration screw 2. The latter can be actuated either with a screwdriver or a coin, or, after having partially slid towards the outside, can be actuated by hand. Rotation of the calibration key rotationally drives the adjustment screw 4, which itself rotationally drives the calibration disc. The calibration disc slides under the tube 8*d'*. Simultaneously, the adjustment screw moves with a longitudinal translational motion, modifying the travel, and therefore the pipetted volume. After measurement of this volume, the operation can be repeated until the measured value equates with the nominal value or with another value desired by the user. Next, the pad 15 is pushed back into the locking position in order to immobilise, in terms of angular position, the calibration disc 8*a* and the adjustment screw 4. The calibration key 2 is pushed back into its housing and the cap is replaced.

It emerges from the above description that the variable-volume pipette body and the fixed-volume pipette body use, in the same volume range, a large majority of common components. These are identified by identical reference numbers in FIGS. 1 and 2. Persons skilled in the art will observe in particular that one and the same component, the calibration collar 8*a*, provides several functions, namely limit stop for end-of-travel, adjustment and/or calibration in both types of pipette. A single basic component, namely the tube 8*d*, respectively 8*d'*, has different structures and functions: the tube 8*d* serves as both guide for the dosing button 3 and housing for the spring 7, and provides an adjustment function as described above. The tube 8*d'*, which differs mainly from the tube 8*d* by the presence of external ribs immobilising it rotation-wise, serves only as guide and housing. It should be noted that the tubes 8*d* and 8*d'* furthermore have identical dimensions. The adjustable-volume pipette body furthermore has a set of metering collars and drive pinions described above, which are not present in the body of the fixed-volume pipette.

Persons skilled in the art will observe in particular that the dimensions of the body of the variable-volume pipette are not different from the dimensions of the fixed-volume pipette body, all the metering collars and drive pinions having been housed respectively within the overall size of the adjustment tube 8*d* and coaxially with the ejection device, inside the internal sleeve 13.

The whole of the adjustment and calibration device is housed within the longitudinal pipette body, with no increase in volume thereof, and the display, which is not masked by the thumb, remains visible to the operator holding their pipette in a natural way.

The arrangement of the metering discs and the drive pinions makes it possible in particular, with no increase in the volume of the body of the pipette, to arrange the ejection button 10 above the grip of the external sleeve, which is ergonomically favourable, the thumb of the user more easily exerting a pressure on the ejection button when it comes above the edge of the hand than when it stands away therefrom, which would be the case if the ejection button had been placed on the opposite side.

The invention claimed is:

1. A mechanical piston pipette, comprising a pipette body, a piston/cylinder assembly, the cylinder being arranged so as to be able to be equipped with a replaceable tip, and a tip ejector device, movable along the cylinder in order to eject a tip from the end of the cylinder, said pipette body accommodating an ejection actuation device, which is part of the tip ejector device, and a piston actuation device effecting given longitudinal translational travel between a low limit stop position and a high limit stop position in order to perform the aspiration of an adjustable volume of liquid, adjustment means of adjusting a pipetted volume by modifying said travel, mechanical means of displaying the pipetted volume and mechanical calibration means, wherein said adjustment means, said display means and said calibration means cooperate as an adjustment and calibration device in which, during a calibration operation, said display means are regulated so as to make the displayed volume equate with a pipetted real volume without modifying said travel, and wherein said adjustment and calibration device is housed inside the pipette body.

2. A mechanical piston pipette according to claim 1, wherein a component defining the low limit stop of said travel changes from a totally locked position to a position in which it can perform transverse motion, wherein, in the locked position, it prevents the adjustment of the longitudinal position of a travel limit stop, and wherein, in said unlocked position, it allows the action of calibration means moving the longitudinal position of said travel limit stop.

3. A pipette according to claim 2, wherein said component defining the low limit stop position is a calibration disc whose longitudinal position is determined by fixed elements of the pipette body and which can be locked rotation-wise or unlocked rotation-wise by locking means accessible from the outside without dismantling other elements of the pipette.

4. A pipette according to claim 3, wherein said calibration disc is coaxial with an adjustment screw to which it is fixed rotation-wise, wherein said adjustment screw is free to slide longitudinally with respect to said calibration disc, the lower end of said adjustment screw actuating the piston of the pipette, wherein said adjustment screw carries an over-travel limit stop fixed to said adjustment screw, the distance between said over-travel limit stop and said calibration disc, the pipette being at rest, defining said travel, and wherein the adjustment screw is arranged in such a way in the pipette body that a rotation of said adjustment screw is necessarily accompanied by a helicoidal motion.

5. A pipette according to claim 4, wherein said helicoidal movement is obtained by means of longitudinal threads connecting said adjustment screw to a dosing button, and wherein said dosing button also constitutes a member making it possible to actuate the adjustment screw in order to perform the pipetting operations.

6. A pipette according to claim 5, wherein said dosing button accommodates a calibration key fixed rotation-wise to said adjustment screw and free to slide longitudinally.

7. A pipette according to claim 6, wherein, during the pipetting operations, the dosing button slides longitudinally in a tube to which it is fixed rotation-wise.

8. A pipette according to claim 7, wherein the lower end of said tube rests on said calibration tube.

9. A pipette according to claim 8, wherein said tube interacts with said calibration disc by means of a claw device capable of rotationally driving said tube.

10. A pipette according to claim 9, wherein a device for mechanical display of the volume slaved to the rotation of said tube is provided.

11. A pipette according to claim 10, wherein the device for displaying the volume comprises metering collars coaxial with said tube and drive pinions housed with the ejection device.

12. A pipette according to claim 11, wherein said display device is housed in the lower half of the pipette body.

13. A mechanical piston pipette comprising a pipette body, a piston/cylinder assembly, the cylinder being arranged so as to be able to be equipped with a replaceable tip, and a tip ejector device, movable along the cylinder in order to eject a tip from the end of the cylinder, said pipette body accommodating an ejection actuation device, which is part of the tip ejector device, and a piston actuation device effecting given longitudinal translational travel between a low limit stop position and a high limit stop position in order to perform the aspiration of a fixed volume of liquid, with means of modifying said travel, wherein a component defining the low limit stop of said travel changes from a totally locked position to a position in which it can perform transverse motion, wherein, in the locked position, it prevents the adjustment of the longitudinal position of a travel limit stop, and wherein, in said unlocked position, it allows the action of calibration means adjusting the longitudinal position of said travel limit stop, wherein said longitudinal position of said travel limit stop defines said travel and, therefore, said volume of liquid, and wherein the component defining the low limit stop position is housed inside the pipette body.

14. A pipette according to claim 13, wherein said component defining the low limit stop position is a calibration disc whose longitudinal position is determined by fixed elements of the pipette body and which can be locked rotation-wise or unlocked rotation-wise by locking means accessible from the outside without dismantling other elements of the pipette.

15. A pipette according to claim 14, wherein said calibration disc is coaxial with an adjustment screw to which it is fixed rotation-wise, wherein said adjustment screw is free to slide longitudinally with respect to said calibration disc, the lower end of said adjustment screw actuating the piston of the pipette, wherein said adjustment screw carries an over-travel limit stop fixed to said adjustment screw, the distance between said over-travel limit stop and said calibration disc, the pipette being at rest, defining said travel, and wherein the adjustment screw is arranged in such a way in the pipette body that a rotation of said adjustment screw is necessarily accompanied by a helicoidal motion.

16. A pipette according to claim 15, wherein said helicoidal movement is obtained by means of longitudinal threads connecting said adjustment screw to a dosing button, and wherein said dosing button also constitutes the member making it possible to actuate the adjustment screw in order to perform the pipetting operations.

17. A pipette according to claim 16, wherein said dosing button accommodates a calibration key fixed rotation-wise to said adjustment screw and free to slide longitudinally.

18. A pipette according to claim 17, wherein, during the pipetting operations, the dosing button slides longitudinally in a tube to which it is fixed rotation-wise.

19. A pipette according to claim 18, wherein the lower end of said tube rests on said calibration tube.

20. A pipette according to claim 19, wherein said tube is locked rotation-wise with respect to the body of the pipette.

* * * * *